Feb. 27, 1951　　　　R. M. FOLKEN　　　　2,543,282
POSTHOLE DIGGER
Filed June 26, 1947　　　　　　　2 Sheets-Sheet 2
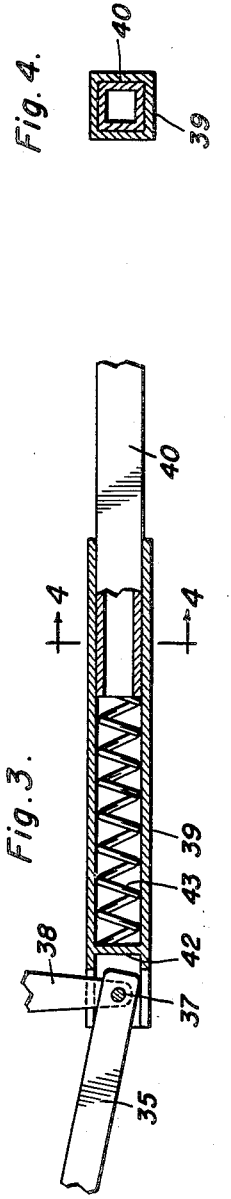
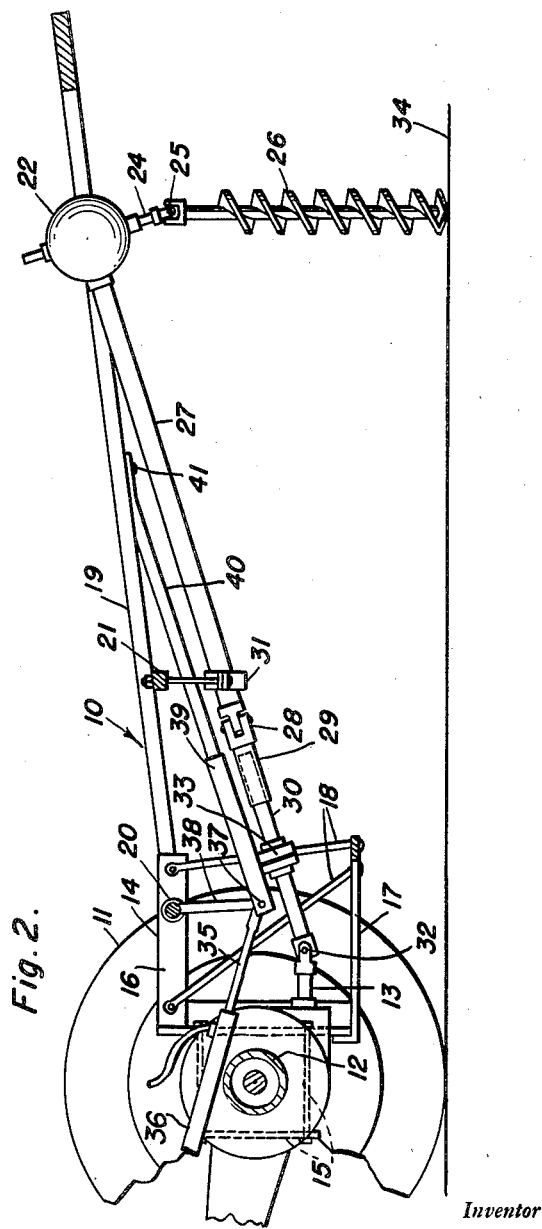
Inventor
Roy M. Folken Patented Feb. 27, 1951

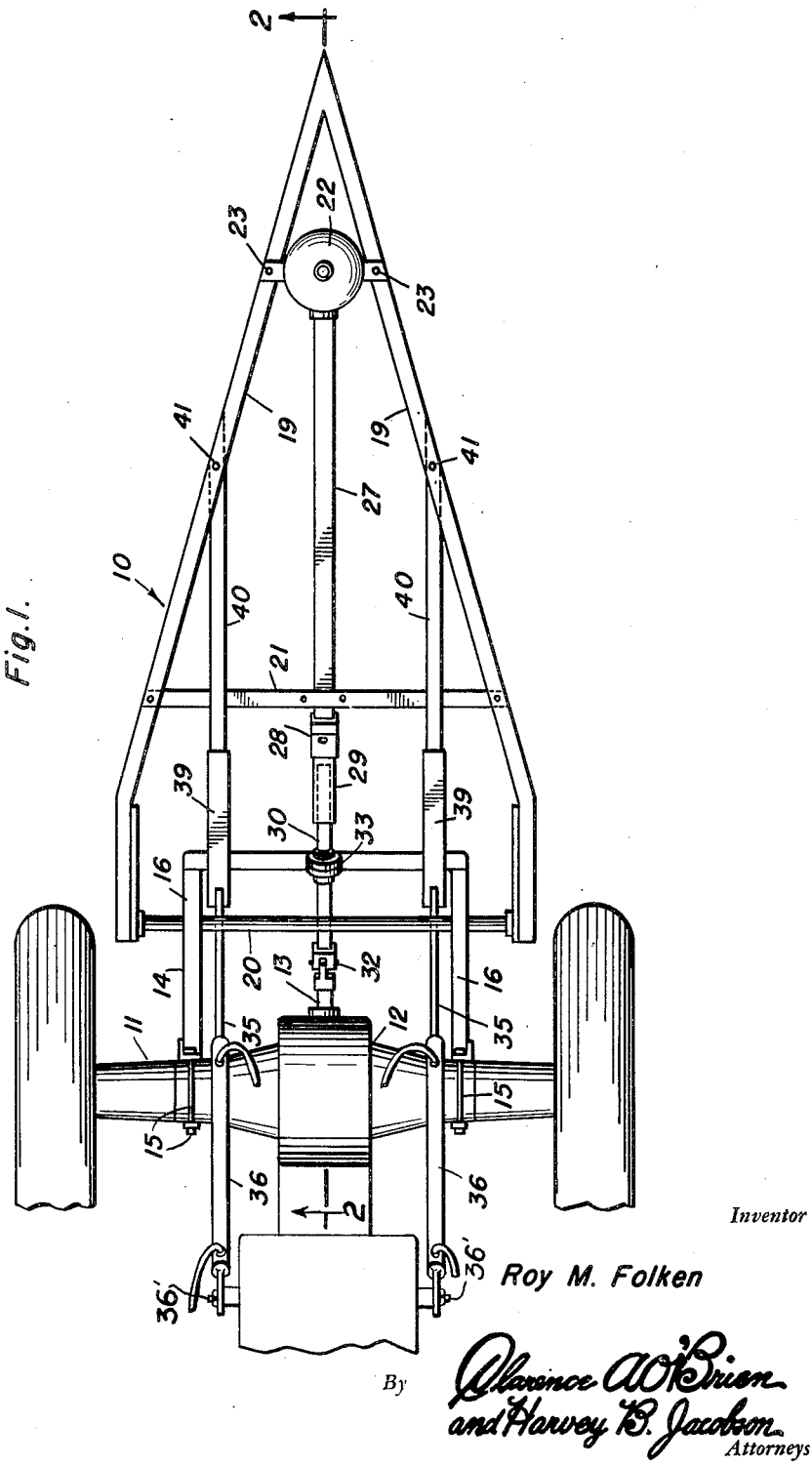

2,543,282

UNITED STATES PATENT OFFICE 2,543,282

POSTHOLE DIGGER

Roy M. Folken, Clarkson, Nebr.

Application June 26, 1947, Serial No. 757,138

1 Claim. (Cl. 255—19)

This invention relates to new and useful improvements and structural refinements in post hole diggers, and the principal object of the invention is to provide a device of the character herein described, which may be convenient and effectively employed in association with farm tractors, or the like, for the digging of holes in the ground for fence posts, stakes, and for other similar articles.

A further object of the invention is to provide a post hole digger which is simple in construction, convenient in operation, and which may be quickly and easily attached to or detached from the tractor with which it is employed.

Another object of the invention is to provide a digger which may be employed for the formation of holes, disposed either vertically or angularly with respect to the ground surface.

An additional object of the invention is to provide a post hole digger which will not easily become damaged, which will readily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Fig. 1 is a top plan view of the invention;

Fig. 2 is a cross sectional view, taken substantially in the plane of the line 2—2 in Fig. 1;

Fig. 3 is a cross sectional detail of a shock absorber used in the invention; and Fig. 4 is a cross sectional view, taken substantially in a plane of the line 4—4 in Fig. 3.

Like characters of reference are used to designate like parts in the specification throughout the several views.

Referring now to the accompanying drawings in detail, the invention consists of a post hole digger designated generally by the reference character 10, the same being adapted for attachment to a suitable farm tractor 11 which includes in its construction the usual rear axle housing 12 and a rearwardly projecting power take-off shaft 13.

To facilitate the attachment of various implements, such as cultivators, plows, or the like, to the tractor, the axle housing 11 is often provided with a carrier assembly 14 which is attached to the axle housing as at 15 and includes a pair of rearwardly projecting top members 16 and a pair of rearwardly projecting bottom members 17, reinforced as at 18.

The digger attachment 10, as it may be called, consists of a boom 19 comprising a pair of convergent side members which are secured together at one end, while the remaining ends thereof are rigidly attached to a transversely extending rod 20, journaled in the members 16 of the carrier 14. The members of the boom 19 are reinforced by a cross member 21, and a gear head 22 is secured to the free, outer end portion of the boom, as indicated at 23.

The gear head 22 includes a driven shaft 24 which is operatively connected by means of a universal joint 25 to an upright auger 26. The driven shaft 24 is also operatively connected by means of suitable gearing (not shown) in the gear head to a drive shaft 27 which is tubular in form and extends forwardly from the gear head and is connected by a further universal joint 28 to an extension shaft consisting of two telescoped sections 29, 30. Suitable means (not shown) are employed to assure simultaneous rotation of the telescoped sections, as will be clearly understood. It will be also noted that a suitable bearing block 31 is attached to the aforementioned cross member 21 to accommodate the shaft 27 as is best shown in Figure 2.

The extension shaft 29, 30 is operatively connected by means of a universal joint 32 to the power take-off shaft 13 and, if desired, the shaft 30 may assume the form of two sections which are connected together by a coupling 33.

Accordingly, it will be seen that the drive from the shaft 13 will be transmitted through the medium of the shafts 30, 29, 27 and 24 to the auger 26, so that the latter may be effectively employed for boring holes in the ground 34. By virtue of the universal joint 25, such holes may be bored either vertically or in an angular relation with respect to the ground level, as will be clearly apparent.

The essence of novelty in the invention resides in the provision of means for raising and lowering the boom 19, so as to "feed" the auger 26 into the ground, or for withdrawing the auger from the ground, as the case may be. Said means consists of a pair of piston rods 35 which are associated with conventional hydraulic double acting cylinders 36 pivoted to the tractor frame as at 36', the rods 35 being pivotally connected as at 37 to a pair of arms 38 secured upon the aforementioned rod 20. It should be understood that the rod 20, the arms 38 and the boom 19 are rotatable on a horizontal axis as a unit, and that by virtue of the weight of the auger 26 and gear head 22, the boom is susceptible to stresses of deflection in a vertical plane.

To counteract this deflection of the boom, pairs of slidably telescoped struts 39, 40 are provided, the struts 39 being connected to the arms 38 at 37 and the struts 40 being rigidly secured to the outer end portion of the boom 19, as at 41. The struts 39 are provided with suitable end plates or partitions 42, and compression springs 43 are interposed between these partitions and the adjacent ends of the strut 40, whereby the springs urge the struts 39, 40 in opposite directions and counteract the tendency of the boom to deflect or bend downwardly.

Needless to say, the boom may be lowered or raised as desired by simply actuating the cylinders 36, since the actuation of the cylinders will be transmitted to the boom not only through the medium of the arms 38 and shaft 20, but also through the struts 39, 40 and the springs 43.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention what is claimed as new is:

In a post hole digging attachment for tractors, the combination of a frame adapted to be secured to the rear of a tractor, a transversely extending shaft rotatably journalled in said frame, a rearwardly extending boom secured at its forward end to said shaft, an arm secured to and depending from said shaft substantially at right angles to and under said boom, a shiftable actuating rod connected to said arm, means on the tractor for shifting said rod whereby said boom may be lowered and raised, a hole drilling auger suspended from the rear end of the boom, means operatively connected to the tractor for rotating said auger, and a strut for counteracting deflection of said boom in a vertical plane, said strut being disposed longitudinally under the boom and comprising a pair of slidably telescoped sections and a compression spring therebetween for urging the same in opposite directions, one of said sections being connected to an intermediate portion of the boom and the second section being connected to said arm.

ROY M. FOLKEN.

REFERENCES CITED

The following references are of record in the file of this patent:

UNITED STATES PATENTS

| Number | Name | Date |
| --- | --- | --- |
| 1,542,720 | Phillips | June 16, 1925 |
| 2,320,775 | Garner | June 1, 1943 |
| 2,410,508 | Lamme | Nov. 5, 1946 |